United States Patent
Coyle

(10) Patent No.: US 7,496,686 B2
(45) Date of Patent: Feb. 24, 2009

(54) LOCALIZING A REMOTE EVENT TIMESTAMP FROM A NETWORK DEVICE WITH AN INDEPENDENT CLOCK METHOD AND APPARATUS

(75) Inventor: Jonathan V. Coyle, Downers Grove, IL (US)

(73) Assignee: Genesus, Schenectady, NY (US)

( * ) Notice: Subject to any disclaimer, the term of this patent is extended or adjusted under 35 U.S.C. 154(b) by 724 days.

(21) Appl. No.: 11/044,217

(22) Filed: Jan. 28, 2005

(65) Prior Publication Data

US 2006/0173952 A1    Aug. 3, 2006

(51) Int. Cl.
*G06F 15/16* (2006.01)
(52) U.S. Cl. .............. 709/248; 709/200; 709/223; 709/224; 709/228
(58) Field of Classification Search .......... 709/223, 709/224, 228, 248, 200
See application file for complete search history.

(56) References Cited

U.S. PATENT DOCUMENTS

| | | | |
|---|---|---|---|
| 6,587,875 B1 * | 7/2003 | Ogus | 709/223 |
| 6,687,752 B1 * | 2/2004 | Falco et al. | 709/230 |
| 6,954,818 B2 * | 10/2005 | Kent | 710/306 |
| 2003/0220105 A1 * | 11/2003 | Daigremont et al. | 455/424 |
| 2006/0153182 A1 * | 7/2006 | Lockridge et al. | 370/389 |

OTHER PUBLICATIONS

D. Mills, Simple Network Time Protocol (SNTP) Version 4 for IPv4, IPv6 and OSI, pp. 1-18.

* cited by examiner

*Primary Examiner*—Liangche A Wang
(74) *Attorney, Agent, or Firm*—Baker & Hostetler LLP

(57) ABSTRACT

A timestamp localization method and device includes two processors with independent clocks connected to a communication network. Two messages are exchanged between the processors. First a request message is sent with a transmit timestamp. Second, a reply message is sent back with receive, originate, transmit and remote timestamps. Then the remote timestamp is converted to a local timestamp using an algorithm and the timestamps from the reply message.

15 Claims, 3 Drawing Sheets

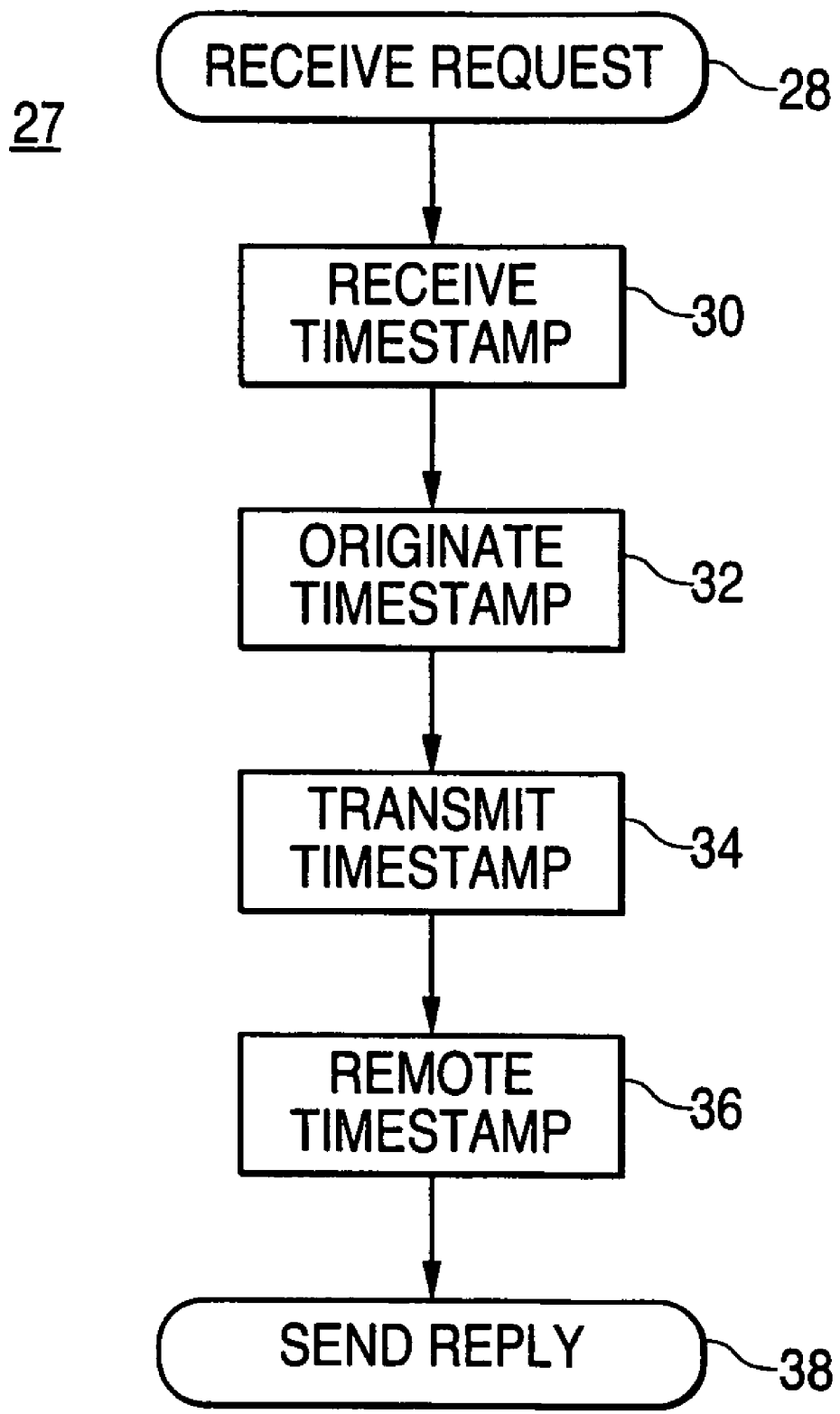

LOCALIZING A REMOTE EVENT TIMESTAMP FROM A NETWORK DEVICE WITH AN INDEPENDENT CLOCK METHOD AND APPARATUS

FIELD OF THE INVENTION

The present invention relates generally to computer networks. More particularly, the present invention relates to time stamping for network devices with independent clocks.

BACKGROUND OF THE INVENTION

The proliferation of computer networks has necessitated the development of methods for justifying the time settings on individual computers connected to a network. For example, when any event that has a temporal component occurs in one computer connected to a communications network, and the event needs to be conveyed from that computer to another computer on the network, the time recorded by the first computer must be justified to the time kept by the second computer. A solution has been to implement a real-time clock in each device synchronized to the time kept on a real-time server using, for example, the simplified network time protocol (SNTP), which is defined in Request for Comments (RFC) 2030. SNTP is an adaptation of the network time protocol (NTP) used to synchronize computer clocks on the internet. SNTP can be used when the ultimate performance of the full NTP implementation is not needed or justified. SNTP is a simplified access strategy for servers and clients using NTP as specified and deployed in the internet.

In SNTP, an event is time stamped using the current value of the local clock. Since the various computers on an SNTP network are assumed to be synchronized, an event timestamp sent from one computer on the network to another computer on the network is used without modification. SNTP implementation requires a real-time clock server active on the network, assumes all devices on the network have been synchronized, and requires eight bytes of data to contain the timestamp value in a message between computers on the network.

SNTP uses the standard NTP timestamp format, which specifies time as a fixed-point binary number including a 32-bit integer segment and a 32-bit fraction segment. Thus SNTP timestamps are represented as a 64-bit unsigned fixed-point number in seconds relative to 0 hours on Jan. 1, 1900. The timestamp is stored in big-endian fashion, starting from the high-order or left hand position.

In some situations, these requirements may not be available to the system. In such cases, a method is needed to pass timestamp information between devices with independent clocks. Furthermore, most devices have a clock with a finite limit to the number of clock ticks that can be counted. When this value is reached, the next tick results in the time value rolling over to zero, resulting in an invalid timestamp value. Accordingly, it is desirable to provide a method and apparatus that pass timestamp information between devices with independent clocks on a network. Furthermore, it is desirable that the method and apparatus account for a possible rollover of the tick count.

SUMMARY OF THE INVENTION

The foregoing needs are met, to a great extent, by the present invention, wherein in one aspect a method and apparatus are provided that in some embodiments transfer timestamp information between network devices with independent clocks, accounting for possible rollover of the tick count.

In accordance with one aspect of the present invention, a method of localizing a remote timestamp includes setting a first transmit timestamp and sending a request message; receiving the request message and setting a receive timestamp, a second transmit timestamp, and a remote timestamp; and sending a reply message including the receive timestamp, the second transmit timestamp, and the remote timestamp. The method further includes receiving the reply message, setting a destination timestamp, and calculating a local timestamp that corresponds to the remote timestamp.

In accordance with another aspect of the present invention, a method of localizing a remote timestamp includes setting a first transmit timestamp to correspond to a first local clock time at which a request message is sent and sending the request message to a remote device, the request message including the first transmit timestamp. The method also includes receiving a reply message from the remote device including an originate timestamp, a receive timestamp, a second transmit timestamp and a remote timestamp corresponding to a first remote clock time at which a remote event occurred, setting a destination timestamp to correspond to a second local clock time at which the reply message is received, and calculating a local timestamp corresponding to a third local clock time at which the remote event occurred.

In accordance with yet another aspect of the present invention, a computer program product for enabling a computer to localize a remote timestamp includes software instructions for enabling the computer to perform predetermined operations and a computer readable medium bearing the software instructions. The predetermined operations include setting a first transmit timestamp to correspond to a first local clock time at which a request message is sent; sending the request message to a remote device, the request message including the first transmit timestamp; receiving a reply message from the remote device including an originate timestamp, a receive timestamp, a second transmit timestamp and a remote timestamp corresponding to a first remote clock time at which a remote event occurred; setting a destination timestamp to correspond to a second local clock time at which the reply message is received; and calculating a local timestamp corresponding to a third local clock time at which the remote event occurred.

In accordance with still another aspect of the present invention, a timestamp device includes a local processor configured to be linked to a remote processor and a first transmit timestamp configured to correspond to a first local clock time. The device also includes a request message created by the local processor, wherein the request message is configured to transmit the first transmit timestamp to the remote processor, and the first local clock time corresponds to when the request message is sent. The device further includes a timestamp creator configured to create a local timestamp, wherein the local timestamp is configured to correspond to a second local clock time when a remote event occurred and to be created from an originate timestamp, a receive timestamp, a second transmit timestamp, a destination timestamp, and a remote event timestamp corresponding to a remote clock time when the remote event occurred.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 3 is an exemplary timestamp format of a type suitable for use in one embodiment of the invention.

DETAILED DESCRIPTION

Figure 1:
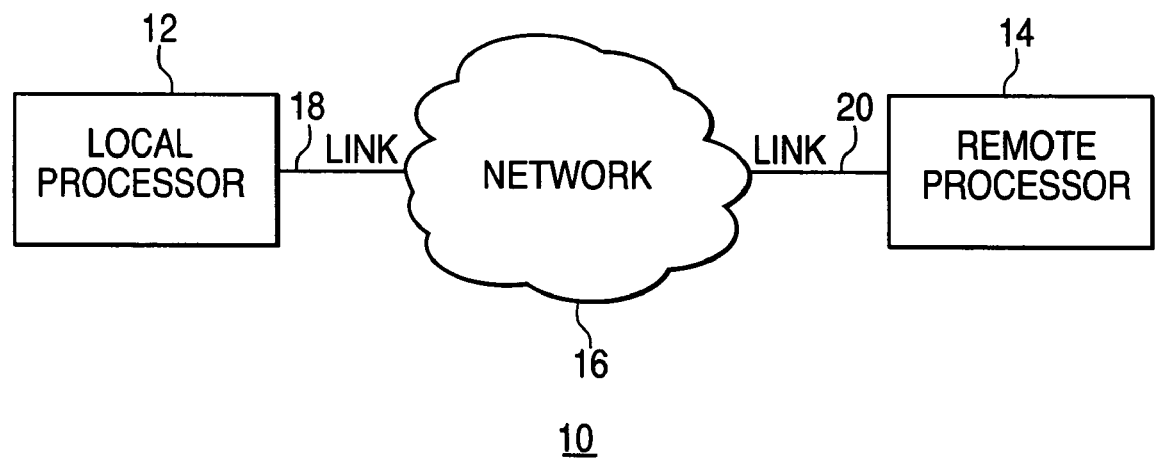
FIG. 1 is a diagrammatic representation illustrating a timestamp device according to a preferred embodiment of the invention.

The invention will now be described with reference to the drawing figures, in which like reference numerals refer to like parts throughout. For the purposes of this discussion, the time according to the clock in the local processor 12 will be referred to as local time and the time according to the clock in the remote processor 14 will be referred to as remote time. An embodiment in accordance with the present invention provides a local computer or processor, a remote computer or processor, and a network linking the local computer and the remote computer. A request message is sent from the local computer to the remote computer containing a local transmit timestamp. A reply message is then sent from the remote computer to the local computer containing an originate timestamp, a receive timestamp, a remote transmit timestamp and a remote event timestamp. Upon receiving the reply message, the local computer sets a destination timestamp and calculates a local timestamp that corresponds to the remote event timestamp.

An embodiment of the present inventive apparatus is illustrated in FIG. 1, which includes a local processor 12, a remote processor 14 and a communication network 16. The local processor 12 is connected to the network 16 by a link 18, and the remote processor 14 is connected to the network 16 by another link 20. In order to localize a timestamp, two messages are required. A dialogue between two computers on a network consists of a request message and a reply, or acknowledge message. The computers on the network build dialogues dynamically by overwriting earlier timestamp values from previous exchanges or dialogues. First, a message is sent from the local processor 12 over the network 16 to the remote processor 14. Then a second message is sent from the remote processor 14 over the network 16 to the local processor 12.

The first message from the local processor 12 to the remote processor 14 includes a transmit timestamp, which corresponds to the local time on the local processor 12 when the first message is sent. The second message from the remote processor 14 to the local processor 12 includes four timestamps: 1) a receive timestamp which corresponds to the local time at the remote processor 14 when the first message is received; 2) an originate timestamp, which is set to the original transmit timestamp contained in the first message; 3) a remote transmit timestamp, which corresponds to the remote time at the remote processor 14 when the second message is transmitted; and 4) a remote event timestamp, which corresponds to the remote time at the remote processor 14 when an event occured on the remote processor 14.

Upon receiving the second message from the remote processor 14, the local processor 12 sets a destination timestamp, which corresponds to the local time at the local processor 12 when the second message is received from the remote processor 14. The local processor 12 then uses the originate timestamp, the transmit timestamp, the remote event timestamp, the receive timestamp and the destination timestamp to calculate a local timestamp, which corresponds to the local time on the local processor 12 when the remote event occurred on the remote processor 14.

Figure 2:
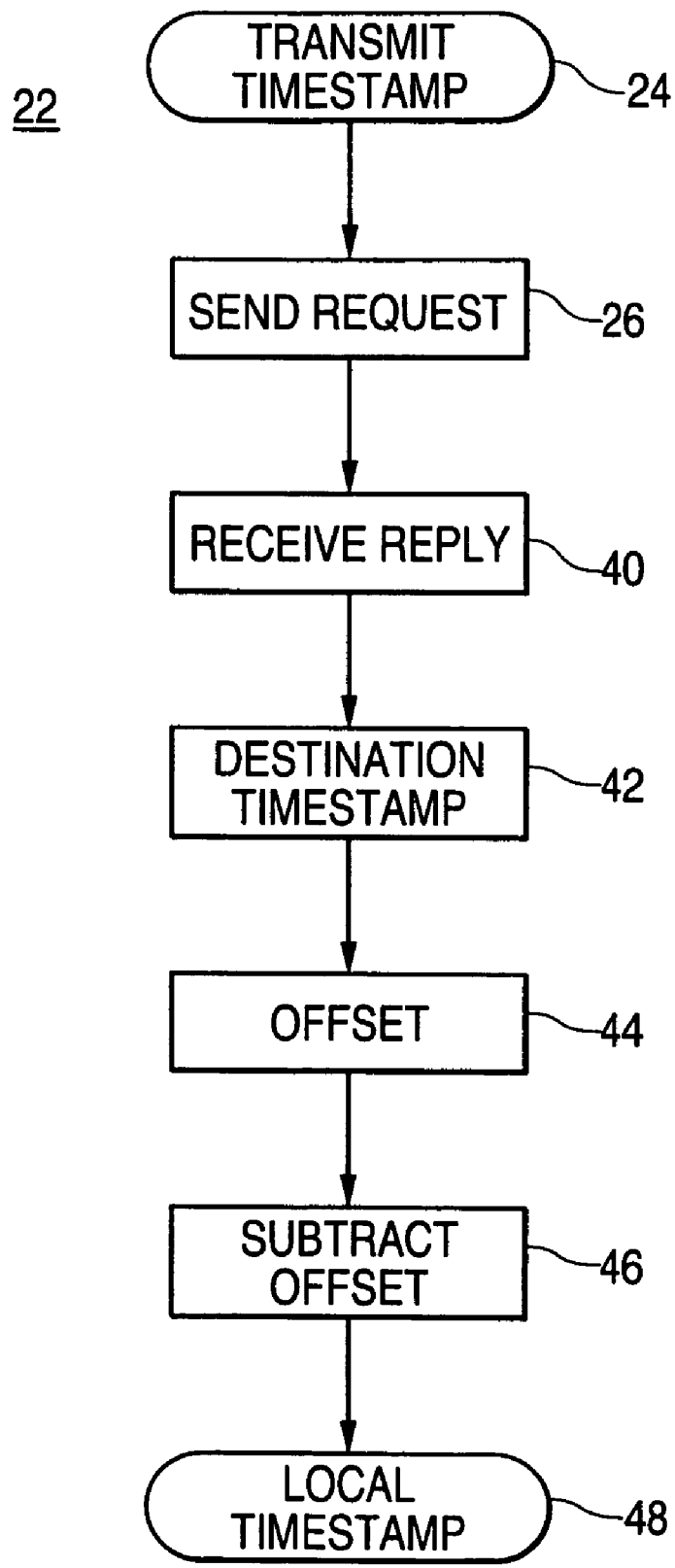
FIG. 2 is a diagrammatic representation of a request message and reply message round trip time sequence.

A flow chart 22 of the steps carried out by the local processor 12 is illustrated in FIG. 2. Similarly, a flow chart 27 showing the steps carried out by the remote processor 14 is illustrated in FIG. 3. To initiate the timestamp localization procedure, the local processor 12 sets a transmit timestamp 24, as shown in FIG. 2, which corresponds to the local time on the local processor 12 at which a request message is sent from the local processor 12 to the remote processor 14. The timestamp values other than the transmit timestamp 24 in the request message are set to zero. Next the local processor 12 sends the request message in step 26 to the remote processor 14.

As shown in FIG. 3, the remote processor 14 receives the request message in step 28. Upon receiving the request message, the remote processor 14 sets a receive timestamp in step 30. The receive timestamp corresponds to the remote time at the remote processor 14 when the request message is received. The remote processor 14 then sets an originate timestamp 32 equal to the time recorded in the request message transmit timestamp, as set in the local processor 12 in step 26. The remote processor 14 includes the receive timestamp 30 and the originate timestamp 32 in a reply message. The remote processor 14 sets the transmit timestamp 34 in the reply message to the remote time in the remote processor 14 when the reply message is sent to the local processor 12 in step 38.

Returning now to FIG. 2, the local processor 12 receives the reply message in step 40 and sets a destination timestamp 42 to the local time in the local processor 12 when the reply message was received in step 40. The local processor 12 then determines an offset 44 between the remote time of the remote processor 14 and the local time of the local processor 12. The local processor 12 then subtracts the offset from the remote event timestamp 36 in step 46 to calculate a local timestamp 48 that corresponds to the local time on the local processor 12 when the remote event occurred in the remote processor 14.

The offset 44 and the local timestamp 48 are calculated by the local processor 12 as follows: "Teo" is defined as the remote time at which the remote event occurred in the remote processor 14, which corresponds to the remote timestamp 36. "Tel" is the local time in the local processor 12 when the remote event occurred in the remote processor 14, which corresponds to the local timestamp 48. "T1" is the originate timestamp 32, which corresponds to the local time at the local processor 12 when the request message was sent to the remote processor 14 in step 26. "T2" is the receive time value when the request message is received in step 28 by the remote processor 14, which corresponds to the receive timestamp 30. "T3" is the transmit time value of the reply message sent by the remote processor 14 in step 38, which corresponds to the transmit timestamp 34. "T4" is the destination time value when the reply message was received in step 40 by the local processor 12, which corresponds to the destination timestamp 42.

The time required for a round trip message to be sent from the local processor 12 over the network 16 to the remote processor 14 and from the remote processor 14 over the network 16 back to the local processor 12 is referred to as "d." Finally, the time offset, "t," is the difference between the local time in the local processor 12 and the remote time in the remote processor 14.

Thus, when a device receives a request message it saves the current local time value (T4) and the transmit time value of the received message (T3) for use in the reply message. These values, along with the T1, T2 and Teo values of the reply message are used to convert an event time value to a local time value (Tel). By definition, $$d=(T4-T1)-(T2-T3),$$

$$T2=T1+t+\tfrac{1}{2}d, \text{ and}$$

$$T4+t=T3+\tfrac{1}{2}d.$$

Solving for t, the offset is:

$$t=((T2-T1)+(T3-T4))\div 2$$

In order to account for possible rollover of the clock tick count, a modulo operation (%) is required. The modulo value, "M," is equal to the maximum possible value of the tick count. In a binary number system, it is most convenient to select a modulo equal to a power of two. In this case, the modulo operation consists of performing a logical AND operation on the result, with the number of bits equal to the power of two set to one. Thus, the above equation for the offset is modified as follows to account for possible rollover of the tick account:

$$t=[([(T2-T1)\% M]+[(T3-T4)\% M])\div 2]\% M.$$

The remote timestamp 36 is then localized in step 46 by subtracting the offset from the remote timestamp 36. Again, in this calculation the possible rollover of the tick count is accounted for with the modulo operation. The resulting formula is:

$$Tel=(Teo-t)\% M.$$

This timestamp localization algorithm thus permits the use of any length tick duration and any maximum value for the tick count as determined by the needs of the particular application. However, it assumes that the offset between the local clock and the remote clock is less than or equal to the maximum clock tick count value, or the modulo value. The timestamp localization algorithm is designed for use in digital computers and is particularly adapted to a binary mathematical regime. However, the algorithm is a generic mathematical algorithm, and may be used without modification for any base number system. Since the round-trip transmit time may vary over time, the request and reply message exchange, or dialogue, is repeated for each remote timestamp 36 that is to be localized.

This time localization algorithm permits the use of a timestamp format of any length. For example, NTP and SNTP use a 64-bit unsigned fixed-point number format; however, this timestamp localization algorithm may use a smaller or larger timestamp format, as required for a particular application. For example, the timestamp localization algorithm could use a portion of the SNTP timestamp bits in accordance with the accuracy and maximum time value required for the particular application. Thus, for example, the last four least significant bits of the integer portion of an SNTP time value, that is, bits 28-31, could be used to produce a timestamp with an accuracy of one second and a maximum time value of sixteen seconds. As another example, a timestamp consistent with this timestamp localization algorithm may include a 14-bit tick count value from an independent clock.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of localizing a remote timestamp, comprising:
   setting a first transmit timestamp;
   sending a request message;
   receiving the request message;
   setting a receive timestamp, a second transmit timestamp, and a remote timestamp;
   sending a reply message including the receive timestamp, the second transmit timestamp, and the remote timestamp;
   receiving the reply message;
   setting a destination time; and
   calculating a local timestamp that corresponds to the remote timestamp.

2. The method of claim 1, wherein the first transmit time stamp corresponds to time a first local clock time at which the request message is sent, the receive timestamp corresponds to a first remote clock time at which the request message is received, the second transmit timestamp corresponds to a second remote clock time at which the reply message is sent, the remote timestamp corresponds to a third remote clock time at which a remote event occurred, and the destination timestamp corresponds to a second local clock time at which the reply message is received and the local timestamp corresponds to a third local clock time at which the remote event occurred.

3. The method of claim 1, further comprising:
   including the first transmit timestamp in the request message;
   setting an originate timestamp to a value of the first transmit timestamp; and
   including the originate timestamp in the reply message.

4. The method of claim 1, wherein the step of sending the request message is performed by a local device and the step of receiving the request message is performed by a remote device, and the step of sending the reply message is performed by the remote device and the step of receiving the reply message is performed by the local device.

5. The method of claim 4, wherein the local device sets the first transmit timestamp; and the remote device sets the receive timestamp, the originate timestamp, the second transmit timestamp and the remote timestamp; and the local device sets the destination timestamp and calculates the local timestamp.

6. The method of claim 1, wherein the first transmit time stamp is calculated according to $$T1=T1'\% M,$$

the receive timestamp is calculated according to $$T2=T2'\% M,$$

the second transmit timestamp is calculated according to $T3=T3'\% M$, the remote timestamp is calculated according to $Teo=Teo'\% M$, and the destination timestamp is calculated according to $T4=T4'\% M$, wherein T1 is the first transmit time stamp, T1' is a first local clock time at which the request message is sent, T2 is the receive timestamp, T2' is a first remote clock time at which the request message is received, T3 is the second transmit timestamp, T3' is a second remote clock time at which the reply message is sent, Teo is the remote timestamp, Teo' is a third remote clock time at which a remote event occurred, T4 is the destination timestamp, T4' is a second local clock time at which the reply message is received, M is a modulo value equal to a maximum value of a clock tick count, and % is a modulo operator.

7. A method of localizing a remote timestamp, comprising:
setting a first transmit timestamp to correspond to a first local clock time at which a request message is sent;
sending the request message to a remote device, the request message including the first transmit timestamp;
receiving the request message;
setting a receive timestamp to correspond to a first remote clock time at which the request message is received at the remote device;
setting an originate timestamp to a value of the first transmit timestamp;
setting a second transmit timestamp to correspond to a second remote clock time at which a reply message is sent;
sending the reply message to a local device, the reply message including the originate timestamp, the receive timestamp, the second transmit timestamp and a remote timestamp corresponding to a third remote clock time at which a remote event occurred;
receiving the reply message;
setting a destination timestamp to correspond to a second local clock time at which the reply message is received at the local device;
determining an offset between a local clock associated with the local device and a remote clock associated with the remote device according to $t=[([(T2-T1)\% M1]+[(T3-T4)\% M1])\div 2]\% M1$, wherein t is the offset, T1 is the originate timestamp, T2 is the receive timestamp, T3 is the second transmit timestamp, T4 is the destination timestamp, M1 is a modulo value equal to a maximum value of a clock tick count, and % is a modulo operator; and
calculating a local timestamp corresponding to a third local clock time at which the remote event occurred according to $Tel=(Teo-t)\% M2$, wherein Tel is the local timestamp, Ieo is the remote timestamp, t is the offset, M2 is a modulo value equal to a maximum value of the clock tick count, and % is a modulo operator.

8. The method of claim 7, wherein the first transmit timestamp is calculated according to $T1=T1'\% M3$, the receive timestamp is calculated according to $T2=T2'\% M3$, the second transmit timestamp is calculated according to $T3=T3'\% M3$, the remote timestamp is calculated according to $Teo=Teo'\% M3$, and the destination timestamp is calculated according to $T4=T4'\% M3$, wherein T1 is the first transmit time stamp, T1' is a first local clock time at which the request message is sent, T2 is the receive timestamp, T2' is a first remote clock time at which the request message is received, T3 is the second transmit timestamp, T3' is a second remote clock time at which the reply message is sent, Teo is the remote timestamp, Teo' is a third remote clock time at which a remote event occurred, T4 is the destination timestamp, T4' is a second local clock time at which the reply message is received, M3 is a modulo value equal to a maximum value of the clock tick count, and % is a modulo operator.

9. A method of localizing a remote timestamp, comprising:
setting a first transmit timestamp to correspond to a first local clock time at which a request message is sent;
sending the request message to a remote device, the request message including the first transmit timestamp;
receiving a reply message from the remote device including an originate timestamp, a receive timestamp, a second transmit timestamp and a remote timestamp corresponding to a first remote clock time at which a remote event occurred;
setting a destination timestamp to correspond to a second local clock time at which the reply message is received; and
calculating a local timestamp corresponding to a third local clock time at which the remote event occurred.

10. The method of claim 9, wherein the first transmit timestamp is calculated according to $T1=T1'\% M$, the receive timestamp is calculated according to $T2=T2'\% M$, the second transmit timestamp is calculated according to $T3=T3'\% M$, the remote timestamp is calculated according to $Teo=Teo'\% M$, and the destination timestamp is calculated according to $T4=T4'\% M$, wherein T1 is the first transmit time stamp, T1' is a first local clock time at which the request message is sent, T2 is the receive timestamp, T2' is a first remote clock time at which the request message is received, T3 is the second transmit timestamp, T3' is a second remote clock time at which the reply message is sent, Teo is the remote timestamp, Teo' is a third remote clock time at which a remote event occurred, T4 is the destination timestamp, T4' is a second local clock time at which the reply message is received, M is a modulo value equal to a maximum value of a clock tick count, and % is a modulo operator.

11. A computer program product for enabling a computer to localize a remote timestamp comprising software instructions for enabling the computer to perform predetermined operations and a computer readable medium bearing the software instructions, the predetermined operations including:

setting a first transmit timestamp correspond to a first local clock time at which a request message is sent;

sending the request message to a remote device, the request message including the first transmit timestamp;

receiving a reply message from the remote device including the first transmit timestamp, a receive timestamp, a second transmit timestamp and a remote timestamp corresponding to a first remote clock time at which a remote event occurred;

setting a destination timestamp to correspond to a second local clock time at which the reply message is received;

calculating a local timestamp corresponding to a third local clock time at which the remote event occurred.

12. The computer program product of claim 11, wherein the predetermined operations include:

calculating the first transmit timestamp according to

T1=T1'% M, calculating the receive timestamp according to

T2=T2'% M, calculating the second transmit timestamp according to

T3=T3'% M, calculating the remote timestamp according to

Teo=Teo' % M, and calculating the destination timestamp according to

T4=T4'% M;

wherein T1 is the first transmit time stamp, T1' is a first local clock time at which the request message is sent, T2 is the receive timestamp, T2' is a first remote clock time at which the request message is received, T3 is the second transmit timestamp, T3' is a second remote clock time at which the reply message is sent, Teo is the remote timestamp, Teo' is a third remote clock time at which a remote event occurred, T4 is the destination timestamp, T4' is a second local clock time at which the reply message is received, M is a modulo value equal to a maximum value of a clock tick count, and % is a modulo operator.

13. A timestamp device, comprising:

a local processor configured to be linked to a remote processor;

a communication network linking the local processor and the remote processor;

a memory device associated with the local processor including software instructions to cause the local processor to perform:

setting a first transmit timestamp corresponding to a first local clock time at which a request message is sent, sending the request message including the first transmit timestamp to the second processor, receiving a reply message including at least a receive timestamp, a second transmit timestamp and a remote timestamp, setting a destination timestamp corresponding to a second local clock time at which the reply message is received, and calculating a local timestamp corresponding to a third local clock time at which a remote event occurred; and a memory device associated with the remote processor including software instructions to cause the remote processor to perform:

receiving the request message, setting an originate timestamp to a value of the first transmit timestamp, setting the receive timestamp corresponding to a first remote clock time at which the request message is received, setting the second transmit timestamp corresponding to a second remote clock time at which the reply message is sent, setting the remote timestamp corresponding to a third remote clock time at which the remote event occurred, and sending the reply message including the originate timestamp, the receive timestamp, the second transmit timestamp, and the remote timestamp;

whereby the timestamp device localizes the remote timestamp.

14. The timestamp device of claim 13, wherein the first transmit timestamp is calculated according to

T1=T1'% M, the receive timestamp is calculated according to

T2=T2'% M, the second transmit timestamp is calculated according to

T3=T3'% M, the remote timestamp is calculated according to

Teo=Teo' % M, and the destination timestamp is calculated according to

T4=T4'% M, wherein T1 is the first transmit time stamp, T1' is a first local clock time at which the request message is sent, T2 is the receive timestamp, T2' is a first remote clock time at which the request message is received, T3 is the second transmit timestamp, T' is a second remote clock time at which the reply message is sent, Teo is the remote timestamp, Teo is a third remote clock time at which a remote event occurred, T4 is the destination timestamp, T4' is a second local clock time at which the reply message is received, M is a modulo value equal to a maximum value of a clock tick count, and % is a modulo operator.

15. A timestamp device, comprising:

a local processor configured to be linked to a remote processor;

a first transmit timestamp configured to correspond to a first local clock time;

a request message created by the local processor, wherein the request message is configured to transmit the first transmit timestamp to the remote processor, and the first local clock time corresponds to when the request message is sent;

a timestamp creator configured to create a local timestamp, wherein the local timestamp is configured to correspond to a second local clock time when a remote event occurred and to be created from the first transmit timestamp, a receive timestamp , a second transmit timestamp, a destination timestamp, and a remote event timestamp corresponding to a remote clock time when the remote event occurred.

* * * * *